Figure 1:
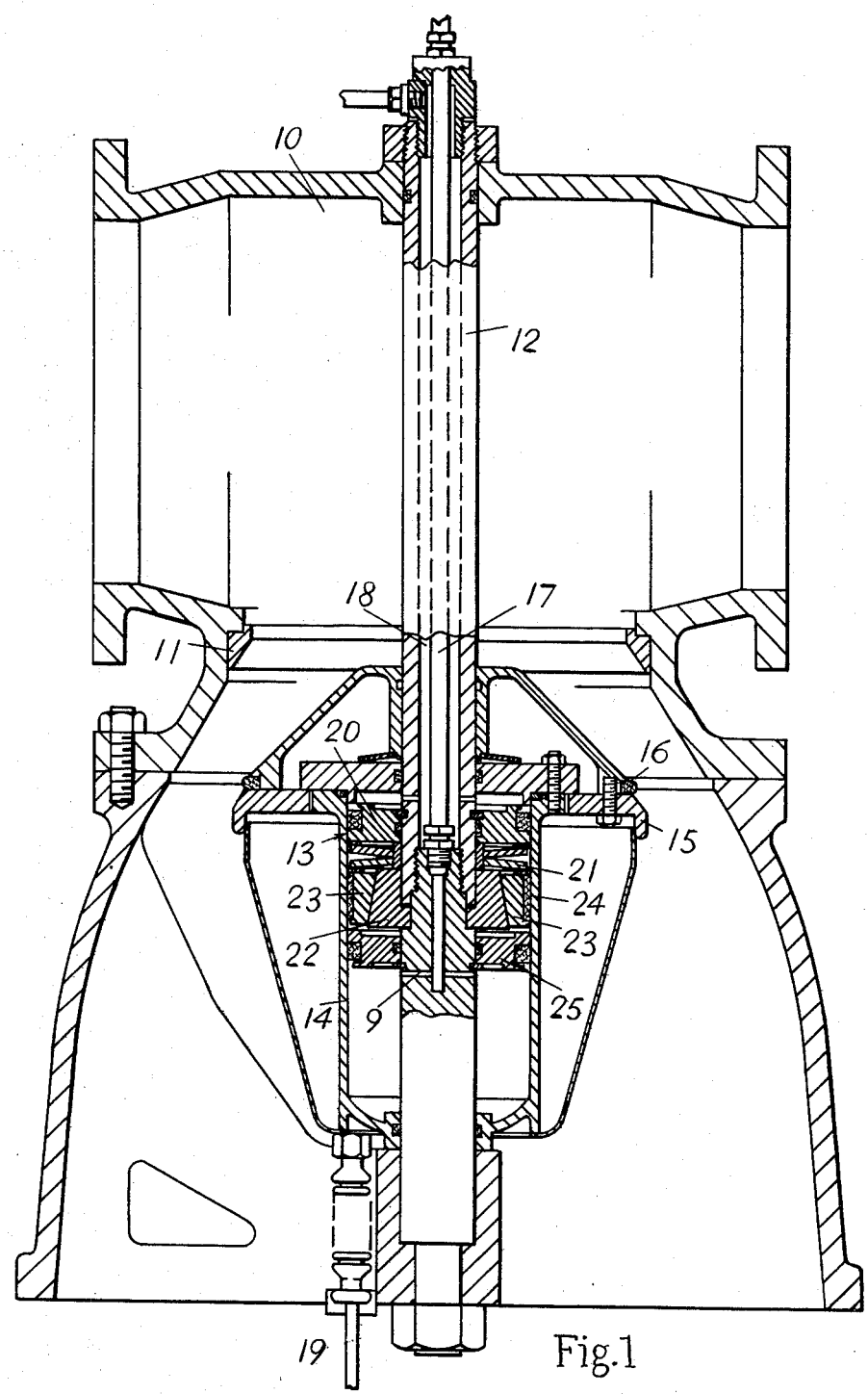

Dec. 15, 1964

T. J. FLOYD 3,161,400

FLUID CONTROL VALVE

Filed May 14, 1963

3 Sheets-Sheet 2

United States Patent Office 3,161,400
Patented Dec. 15, 1964

3,161,400
FLUID CONTROL VALVE
Terence John Floyd, Wellington, England, assignor to
Audco Limited, Newport, England
Filed May 14, 1963, Ser. No. 280,288
9 Claims. (Cl. 251—62)

This invention relates to valves for use in controlling the flow of fluids and has especial reference to valves which are operated by means of a pressurized fluid contained in a circuit or system which is distinct from the circuit or system containing the fluid to be controlled by the valve.

The object of the present invention is to provide a new or improved construction.

According to the invention there is provided a valve having a fixed guide rod, a piston mounted on the guide rod so that at least a part of said piston is secured against axial movement relative to the guide rod, a cylinder engaging said piston and mounted for axial movement on said guide rod, an annular seat formed within the valve and a closure member adapted to engage said seat, said closure member being connected to said cylinder for movement therewith, the arrangement being that pressurised fluid can be supplied to the cylinder on either side of the piston in order to effect axial movement of the cylinder and with it movement of the closure member towards or away from said seat.

A valve constructed in accordance with the above-described arrangement can be remotely controlled and in one convenient embodiment the guide rod is of hollow configuration and has a pipe extending into the interior so as to be provided with two passages namely a passage formed by said pipe and a passage formed between the exterior of the pipe and the interior of the guide rod which serve to lead actuating fluid to the two ends of the cylinder respectively.

Thus in one example, a valve constructed in accordance with the invention may be used in an oil tanker ship wherein the oil carrying space is divided into a plurality of compartments, each compartment having a valve which is mounted in a pipe-line interconnecting the compartments so as to facilitate loading and unloading of the cargo.

In one known construction, such valves have been adapted for manual operation, each valve having a screwed actuating rod which is relatively long and which extends through the depth of the ship from a position at or adjacent the bottom of the associated oil carrying compartment to a position on the upper deck. Such an arrangement is not sound mechanically, owing to the length of the actuating rod and furthermore the operation of a number of such valves spaced over the upper deck, becomes rather unwieldy. With the present arrangement, however, all the valves can be controlled from a relatively small area, all the valve control points being grouped together at any convenient location.

Preferably, means are provided for releasably locking the cylinder and piston together when adjustment of the position of the cylinder has been effected said locking means either being operable at any position throughout the range of movement of the cylinder or being operable in one or more predetermined positions.

The invention will now be more particularly described with reference to the accompanying drawings in which—

FIGURE 1 is a sectional view of one example of a valve constructed in accordance with the invention, the valve being shown in its open position.

Figure 2:
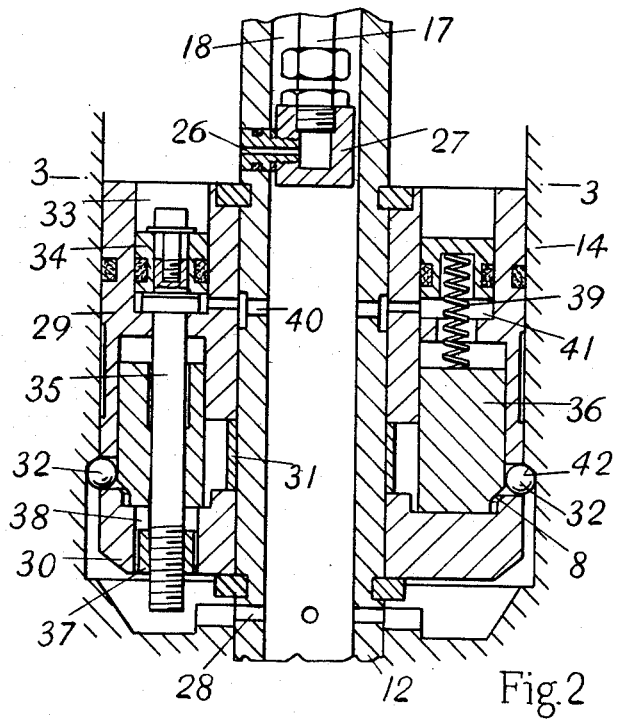
Figure 3:
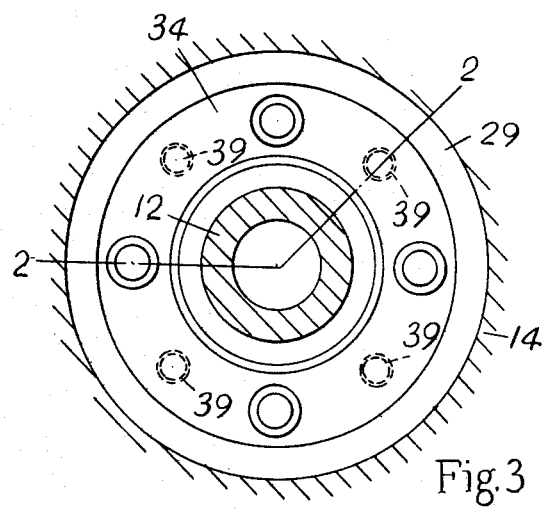

FIGURES 2 and 3 are fragmentary sectional views on a larger scale of an alternative embodiment, FIGURE 2 being a sectional view on the line 2—2 of FIGURE 3 and FIGURE 3 being a sectional plan view on line 3—3 of FIGURE 2, showing in detail valve locking means when the valve is in its closed position.

Figure 4:
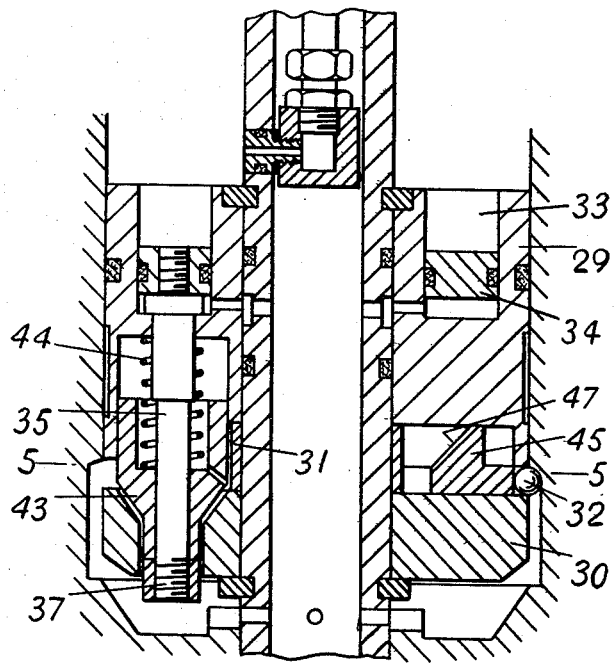
Figure 5:
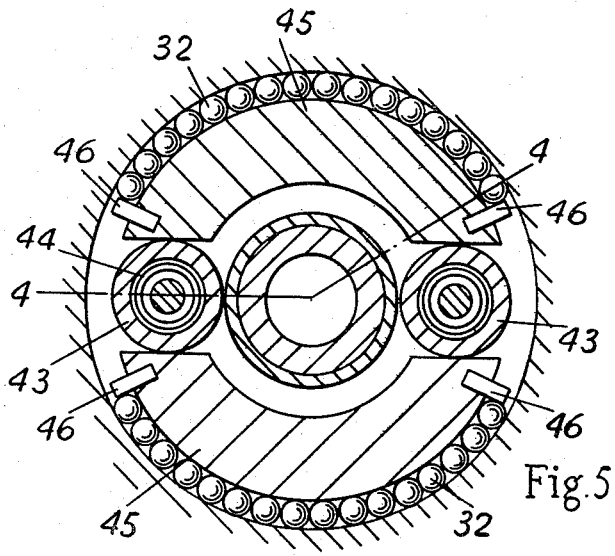

FIGURES 4 and 5 are similar fragmentary sectional views of a further alternative embodiment, FIGURE 4 being a sectional view on the line 4—4 of FIGURE 5 and FIGURE 5 being a sectional view on line 5—5 of FIGURE 4.

Referring now to FIGURE 1 of the drawings, one example of a valve constructed in accordance with the invention is adapted for use in an oil carrying compartment of an oil tanker ship. The valve is mounted in a pipe-line which connects together all the oil carrying compartments, the arrangement being that the valve serves to control the flow of oil to or from the compartment in which it is situated.

The valve is provided with an upper part which has a hollow portion 10 adapted for connection to the pipe-line and beneath said hollow portion is formed an annular valve seat 11, said seat being of frusto-conical or tapered configuration.

Extending through the valve in a generally vertical direction is a guide rod 12 and a piston generally indicated by reference numeral 13 is mounted on the lower end of the guide rod so as to be disposed beneath said valve seat 11. The piston 13 is a composite structure but at least a part of said piston is secured against axial movement relative to the guide rod. There is also provided a cylinder 14 which engages the piston and which is adapted to move axially on the guide rod. The upper end of said cylinder is connected to an annular member 15 which forms a closure member for the aforesaid valve seat 11 the annular member having a resilient annular sealing element 16 which is adapted to be brought into engagement with the valve seat.

The piston disposed within the cylinder thus divides the cylinder into two parts and actuating fluid can be admitted to either of said parts by one of two passages formed in the guide rod. Thus said guide rod is of hollow construction and is provided down its centre with a pipe 17 which communicates through a cross-bore 9 with the lower end of the cylinder 14, an annular space 18 between the central pipe and the wall of the guide rod forming the other passage which is connected to the upper end of the cylinder 14. The cylinder 14 can thus be moved in either axial direction over the stationary piston by admitting high-pressure fluid to the appropriate end of the cylinder. Conveniently, the cylinder is connected by means of a cable 19 to a position indicating device (not shown) having a visual indicator which may be disposed on the deck of the ship so that the position of the associated closure member may be known.

As previously mentioned the piston 13 on which the cylinder 14 slides is a composite structure. The piston embodies an upper annular portion 20 which is secured to the guide rod 12 so as to be prevented from axial movement relative to said guide rod. Below said upper annular portion 20 is a stack of Belleville washers 21 and beneath said washers is a tapered portion 22 of the piston also secured to the guide rod. Said tapered portion is of frusto-conical form and is smaller on its largest diameter than the internal diameter of the cylinder. In the annular space between said tapered portion of the piston and the internal surface of the cylinder are mounted a plurality of segments 23 which are tapered on their inner surfaces and which are provided with friction material 24 on their outer surfaces. The aforementioned washers 21 disposed beneath the upper portion of the piston engage said segments and urge them downwardly over the tapered portion of the piston so that the segments are forced outwardly into engagement with the cylinder 14 thereby gripping the cylinder and preventing movement thereof. Below said tapered portion of the piston is a lower annular portion 25 which is mounted for a slight degree of movement in an axial direction on the guide rod. Upward movement of said lower annular portion 25 has the effect of moving the segments 23 in an upward direction against the force exerted by the spring washers 21 so that the frictional grip on the cylinder is relieved.

When the cylinder is to be moved in an upward direction pressure is applied to the upper end of said cylinder above the piston. As will be evident from FIGURE 1 the smaller end of tapered portion 22 is uppermost and the segments 23 act in the manner of wedges. When pressure is applied to tend to move the cylinder upwardly, the segments 23, being lined only externally with friction material, will tend to move slightly upwardly with the cylinder. Thus the segments will be moved into a larger part of the tapering annular space and thus, their frictional grip on the cylinder will be relieved. When the upward movement of the cylinder has finished the spring washers 21 acting on the segments will again force said segments into frictional engagement with the cylinder.

When it is desired to move the cylinder in a downward direction pressure is applied to the lower end of the cylinder and such pressure will also have the effect of raising the lower annular portion 25 of the piston which in turn will lift the segments 23 so that the frictional grip between the segments and the cylinder will again be relieved.

In the alternative embodiment shown in FIGURES 2 and 3 the pipe 17 communicates by means of passages 26 in a fluted block 27 with the upper end of the cylinder 14. The part of the annular space 18 which is above the block 27 is in communication with the part below the block and thus hydraulic fluid is supplied to the lower end of the cylinder by means of cross bores 28 in the wall of the hollow guide rod 12. The piston comprises an upper portion 29, fixed relative to the guide rod, a lower portion 30, also fixed relative to the guide rod, the two portions being spaced apart by a sleeve 31. In an annular gap between the adjacent axial ends of the said two portions there are disposed a plurality of balls 32 which are arranged to co-act with a step 42 in the cylinder. Formed in the upper face of the upper portion 29 is an annular recess 33 in which an annular piston 34 is mounted. Said annular piston carries four equally spaced rods 35 which extend downwardly through the upper portion 29 and also through a cam ring 36, the rods being slidable in said upper portion 29 and in said cam ring 36 the arrangement being that when the cam ring is in a raised position the balls 32 are able to enter a space below a frusto-conical cam surface 8 on the cam ring. Secured to each of said rods at a position adjacent to the lower end thereof is an abutment in the form of a nut 37 which is movable with the guide rod 35 in an aperture 38 formed in the lower portion 30 of the piston. There are also provided four compression springs 39 the ends of each of which engage respectively with the annular piston 34 and the cam ring 36. Further cross bores 40 are formed in the guide rod whereby fluid can flow between an annular space 31 below the annular piston 34 and the annular space 18 in the guide rod.

When the valve is open the annular piston 34 and the cam ring 36 will be in raised positions so that the balls 32 will not bear against the wall of the cylinder.

Fluid under pressure will be introduced to the upper end of the cylinder to close the valve. The first effect of such action is the depression of the annular piston 34 and the rods 35 slide through the cam ring 36 since the latter is prevented from moving downwardly by the balls 32. The springs 39 are thus compressed. Upward movement of the cylinder then takes place until the valve reaches its closed position at which point the step 42 in the cylinder is presented to the balls 32. The compressed springs 39 then force the cam ring 36 downwardly and the balls are forced outwardly by the action of said cam surface 8. The position is maintained even after the supply of hydraulic pressure to the cylinder has ceased and the valve is thus locked into its closed position.

When it is required to open the valve fluid under pressure is introduced to the lower end of the cylinder and also to the annular space 41 under the annular piston 34. The annular piston is thus raised and the nuts 37 engage the lower surface of the cam ring 36 and raise this also. Downward movement of the cylinder then causes the step 42 to effect inward movement of the balls.

In the further alternative embodiment shown in FIGURES 4 and 5 the piston again comprises an upper 29 and a lower 30 portion, a spacing sleeve 31 and an annular piston 34 movable in an annular recess 33 in the upper portion. Said annular piston carries a pair of rods 35 each of which extends downwardly through an expander 43 having a frusto-conical cam surface and is secured to a nut 37 beneath the expander, the arrangement being that the expander 43 is slidable on the rod. Each expander 43 is also provided with a compression spring 44 which surrounds the associated rod, one end of the spring engaging the upper portion 29 of the piston and the other end engaging the base of a recess formed in the expander. There is also provided a pair of arcuate members 45, each of which has a pair of abutments 46 between which a plurality of balls 32 is disposed. Each of the end portions of said arcuate members 43 which engage the expanders 43 is conveniently provided with a bevelled portion 47 so that the said members can move inwardly and outwardly as the expanders move upwardly and downwardly respectively.

The mode of action of the above described locking means is essentially similar to that of the locking means shown in FIGURES 2 and 3 except that the springs 44 are always in compression when the expanders 43 are in their upper position irrespective of whether the annular piston is in its upper or lower position.

In the embodiments shown in FIGURES 2 and 3 or FIGURES 4 and 5 the valve can be locked in one predetermined position as distinct from the arrangement shown in FIGURE 1 where locking is effected at any position throughout the range of movement of the cylinder.

In further alternative embodiments steps in the cylinder may be provided at more than one position so that a suitable locking arrangement may lock the valve in its open position and its closed position and possibly at further intermediate predetermined positions.

The closure member 15 may be structurally separate from the upper end of the cylinder 14 and may be resiliently mounted thereon as shown in FIGURE 1. This arrangement allows a small amount of upward movement of the cylinder to take place after the closure member has been brought into sealing engagement with the valve seat. Such a small upward movement of the cylinder may be caused by the action of the segments or the balls when they move to their locking positions after the supply of high-pressure fluid to the upper end of the cylinder has been cut off.

Thus a valve as above described can be readily controlled from a position which is remote from the valve whilst the provision of a closure member which is actuated by fluid pressure as above described makes for easy and efficient operation.

Having thus described my invention what I claim as new and desire to secure by Letters Patent is:

1. A fluid control valve comprising a valve casing, an annular seat formed in the casing, a fixed guide rod mounted in the casing and extending through said seat, a composite piston assembly mounted on the guide rod and comprising first and second relatively movable parts of which the first is fixed relative to the guide rod, a hollow cylinder supported by said guide rod, enclosing the piston assembly and sildably engaged with the first part thereof, a closure member connected to the cylinder for axial movement therewith and adapted sealingly to engage said annular seat, passages in said guide rod for conducting actuating fluid to and from opposite sides of said piston assembly, a plurality of locking elements mounted in the piston assembly for radial movement relative thereto, resilient means urging said locking elements into engagement with the cylinder and means connecting said second part of the piston assembly to said locking elements whereby movement of said second part of the piston assembly out of a rest position effects release of the locking elements from the cylinder.

2. A fluid control valve comprising a valve casing, an annular seat formed in the casing, a fixed hollow guide rod mounted in the casing and extending through said seat, a pipe extending along the interior of the guide rod, a composite piston assembly mounted on the guide rod and comprising first and second relatively movable parts of which the first is fixed to the guide rod, the guide rod being formed with a pair of passages, on opposite sides of the piston, which communicate with the interior of the guide rod and the interior of the pipe respectively, a hollow cylinder supported on the guide rod, enclosing the piston assembly and slidably engaged with the first part of the piston assembly, a plurality of locking elements mounted in the piston assembly for radial movement relative thereto, resilient means urging said locking elements into engagement with the cylinder and means connecting said second part of the piston assembly to the locking elements whereby movement of said second part of the piston assembly out of a rest position effects release of the locking elements from the cylinder.

3. A fluid control valve comprising a valve casing, an annular seat formed in said valve casing, a fixed hollow guide rod mounted in the casing and extending through said seat, a pipe extending along the interior of the guide rod, passages in said guide rod connecting the interiors of the guide rod and the pipe respectively with the exterior of the guide rod at positions spaced along the length thereof, a composite piston assembly mounted on the guide rod between said passages, a hollow cylinder supported on said guide rod and enclosing said piston assembly, said piston assembly comprising a first part secured to the guide rod and slidably engaged with said cylinder, a tapered member secured to the guide rod, a plurality of segmental locking elements disposed between the outer surface of the tapered member and the cylinder, each locking element having a lining of friction material engageable with the cylinder, resilient means acting on said locking elements adjacent the smaller end of the tapered member, and a second part slidably mounted on the guide rod, engaged with the cylinder and engageable with the locking elements adjacent the larger end of the tapered member, there being also provided a closure member connected to said cylinder for axial movement therewith and adapted sealingly to engage said annular seat.

4. A fluid control valve as claimed in claim 3 wherein the closure member is slidably mounted on the guide rod and is resiliently connected to the cylinder so as to be capable of limited axial movement relative thereto.

5. A fluid control valve comprising a valve casing, an annular seat in said casing, a fixed hollow guide rod mounted in said casing and extending through said seat, a pipe extending along the interior of the guide rod, passages in the guide rod connecting the interiors of the guide rod and the pipe respectively to the exterior of the guide rod at positions spaced along the length thereof, a composite piston assembly mounted on the guide rod between said passages, a hollow cylinder supported on the guide rod, enclosing the piston assembly and having therein a step, and a closure member connected to the cylinder for axial movement therewith, said piston assembly comprising a fixed part which is secured to the guide rod, engaged by the cylinder and is formed, at that axial end adjacent the passage communicating with the interior of the pipe, with an annular recess, an annular piston slidably mounted in said annular recess, a plurality of balls mounted in a circumferential slot in said fixed part of the piston assembly, resilient means urging said balls radially outwardly and means connecting said annular piston to said balls for relieving said resilient means and permitting radially inward movement of the balls, the axial spacing of said ball-containing slot from the annular seat corresponding to the axial spacing of the closure member from the step in the cylinder so that, when the closure member engages the seat the balls are moved radially outwardly behind said step.

6. A fluid control valve as claimed in claim 5 wherein said means connecting the annular piston to the balls comprises a plurality of axially extending rods secured to the annular piston, a cam ring slidably mounted in the piston assembly and connected with lost motion to said rods and a cam surface on the cam ring which is engageable with said balls on the radially inner sides thereof.

7. A fluid control valve as claimed in claim 6 wherein the closure member is slidably mounted on the guide rod and is resiliently connected to the cylinder so as to be capable of limited axial movement relative thereto.

8. A fluid control valve as claimed in claim 5 wherein said means connecting the annular piston to the balls compries a pair of expanders connected to the annular piston for movement therewith, and each having a frusto-conical cam surface and a pair of arcuate members mounted in the piston assembly for transverse movement relative thereto, each arcuate member engaging the balls along its outer periphery and being engageable by the cam surfaces on the expanders on its inner periphery.

9. A fluid control valve as claimed in claim 8 wherein the closure member is slidably mounted on the guide rod and is resiliently connected to the cylinder so as to be capable of limited axial movement relative thereto.

References Cited by the Examiner
UNITED STATES PATENTS

| | | | |
|---|---|---|---|
| 430,090 | 6/90 | Sewall | 251—62 XR |
| 2,733,729 | 2/56 | Wolfe | 251—297 XR |
| 2,752,930 | 7/56 | Stouder | 251—297 XR |
| 2,953,345 | 9/60 | Slemmons | 251—62 XR |
| 3,038,691 | 6/62 | Auverkamp | 251—62 XR |

M. CARY NELSON, *Primary Examiner*.